United States Patent [19]

Taureg et al.

[11] Patent Number: 4,885,957
[45] Date of Patent: Dec. 12, 1989

[54] DISCONNECTABLE TRANSMISSION ASSEMBLIES

[75] Inventors: Herbert Taureg, Hennef; Helmut Wiese, Neunkirchen-Seelscheid; Paul E. Schönenbrücher, Much-Kranüchel, all of Fed. Rep. of Germany

[73] Assignee: Viscodrive GmbH, Lohmar, Fed. Rep. of Germany

[21] Appl. No.: 290,180

[22] Filed: Dec. 22, 1988

[30] Foreign Application Priority Data

Dec. 22, 1987 [DE] Fed. Rep. of Germany ....... 3743474

[51] Int. Cl.⁴ .................. F16D 47/06; B60K 17/34; F16H 1/44
[52] U.S. Cl. .................... 74/710.5; 192/48.3; 192/57; 192/58 B; 192/88 B; 180/233; 180/248
[58] Field of Search ............. 192/48.3, 57, 58 B, 192/74, 88 B; 74/710.5, 711, 665 T; 180/233, 247, 248, 197

[56] References Cited

U.S. PATENT DOCUMENTS

| | | | |
|---|---|---|---|
| 2,093,281 | 9/1937 | Kreuser | 192/88 B X |
| 3,547,244 | 12/1970 | Fergle et al. | 192/74 |
| 3,760,922 | 9/1973 | Rolt et al. | 74/710.5 X |
| 3,804,221 | 4/1974 | Valantin | 192/88 B |
| 4,093,052 | 6/1978 | Falk | 192/88 B |
| 4,562,897 | 1/1986 | Renneker | 180/233 |
| 4,605,087 | 8/1986 | Ashauer et al. | 180/248 |
| 4,650,028 | 3/1987 | Eastman et al. | 180/233 |
| 4,721,010 | 1/1988 | Sheldon et al. | 74/665 T X |
| 4,735,279 | 4/1988 | Sato | 180/248 X |

Primary Examiner—Rodney H. Bonck
Assistant Examiner—Richard M. Lorence
Attorney, Agent, or Firm—Toren, McGeady & Associates

[57] ABSTRACT

A disconnectable transmission assembly comprising a coupling member within which is rotatably mounted in bearings a viscous coupling having a housing member and a hub which respectively carry interleaved plates. The coupling member and the housing member are connectable and disconnectable by means of a deformable sleeve which closes a chamber formed in the housing member and which can be supplied by fluid under pressure from a cylinder by movement of a piston. Deformation of the sleeve, which is connected to the housing member, engages the bore of the coupling member thus connecting the housing member and the coupling member for rotation. When the chamber is de-pressurized there is a running clearance between the sleeve and the coupling member.

15 Claims, 4 Drawing Sheets

DISCONNECTABLE TRANSMISSION ASSEMBLIES

BACKGROUND OF THE INVENTION

1. Field of the Invention

This invention relates to a disconnectable transmission assembly which includes a viscous shear coupling. The assembly of the invention has particular, but not exclusive, application in the drive transmission of motor vehicles. The invention is also concerned with motor vehicles including such transmission assemblies.

2. Description of Prior Art

An example of a viscous shear coupling, which is described in GB-PS 1357106 (and in the corresponding U.S. Pat. No. 3,760,922 issued Sept. 25, 1973), comprises a housing part; a hub part within the housing part, the parts being relatively rotatable about a common axis; a viscous liquid in the housing part; and first and second sets of annular plates in the housing part, the plates of the first set being rotationally fast with the housing part and being interleaved with the plates of the second set which are rotationally fast with the hub part.

It is known to use such a viscous shear coupling to control the differential action of a differential gear. This may be done by connecting, in a bevel gear differential gear, the parts of the viscous shear coupling to the carrier and one of the sun gears respectively. Alternatively the parts of the coupling may be connected between the sun gears and this may be effected by the drive shafts driven by the sun gears.

Such a differential may be used in a front or rear driven axle of a motor vehicle. If it is used in the front axle then if one wheel tends to slip the other wheel will continue to be driven. If, however, the wheels of the front axle are braked and they have unequal coefficients of adhesion with the ground this may provide steering problems and thus in such circumstances it is desirable to disconnect the viscous control of the differential.

Viscous shear couplings are used, inter alia, in the drive transmissions of motor vehicles having four-wheel drive of the type known as a viscous transmission. In such a transmission there is a permanently driven axle and a viscous shear coupling is disposed in the drive to the wheels of a second axle thereof. For example, the vehicle may have a forwardly mounted engine, gearbox, and conventional drive arrangement to the vehicle front wheels, with an additional power output from the gearbox leading to a longitudinal drive line and the rear axle of the vehicle, the viscous shear coupling being disposed in such longitudinal drive line. As long as the wheels of the permanently driven front axle, due to a sufficiently high adhesion between tyres and road surface, drives the vehicle with no or substantially no slip, there is practically no speed difference between the two parts of the viscous shear coupling, so that no torque is transmitted to the rear wheels. However, if one of the permanently driven front wheels spins due to lack of adhesion between tyre and road surface, a speed difference occurs across the viscous shear coupling so that torque is transmitted to the rear wheels through the coupling. The rear wheels then participate in driving the vehicle.

Another example of a viscous coupling is shown in European PS-0068309 (and in the corresponding U.S. Pat. No. 4,721,010 issued Jan. 26, 1988). In this coupling there is a housing part and first and second hub parts within the housing part, all the parts being relatively rotatable about a common axis. There are first, second and third sets of annular plates in the housing part, the plates of the first set being rotationally fast with the housing part and being interleaved with the plates of the second and third sets which are rotationally fast with the first and second hub parts respectively. There is a viscous liquid in the housing part.

In another example of a viscous transmission, a viscous shear coupling as described in European PS-No. 0068309 is used in the rear axle and serves both as a drive unit and as a rear-axle inter-wheel differential gear.

With such a viscous transmission, problems can occur under braking. If the vehicle is braked sharply or on a slippery surface so that the front wheels of the vehicle are locked, the action of the viscous shear coupling will be such as to attempt also to lock the rear wheels and this is undesirable since, if the rear wheels lock, lateral stability of the vehicle is impaired. Therefore it has been proposed to include a one-way clutch unit in the viscous transmission so that no torque is transmitted through the longitudinal drive line via the viscous shear coupling when the rear wheels overrun the front wheels (see for example U.S. Pat. No. 4,605,087 issued Aug. 12th 1986). Clearly to provide such an additional clutch unit is expensive and adds weight and complexity to the vehicle.

SUMMARY OF THE INVENTION

It is an object of the present invention to provide a transmission assembly including a viscous shear coupling which is disconnectable by a device which requires little space and which may operate simply by, for example, fluid pressure.

According to one aspect of the invention, therefore, we provide a disconnectable transmission assembly comprising a rigid coupling member having a cylindrical bore; a viscous shear coupling mounted within the bore, the coupling comprising a rigid housing member rotatably mounted in the coupling member, and a hub within the housing member, each of the coupling member, the housing member and the hub being rotatable relative to each other about a common axis, first and second sets of annular elements in the housing, the elements of the first set being rotationally fast with the housing part and being interleaved with the elements of the second set which are rotationally fast with the hub; and a deformable sleeve interposed between opposed parts of the housing member and the coupling member, the sleeve being secured to one of said members and closing a chamber formed between the sleeve and said part of said one member; the arrangement being such that when the chamber is unpressurised said members are relatively rotatable but that the application of a predetermined fluid pressure to the chamber causes the sleeve to deform and engage said part of the other member frictionally to lock the members to rotate together.

An advantage of this arrangement is that the connection and disconnection of the viscous shear coupling is simply achieved and the introduction of the deformable sleeve between the housing member and the coupling member increases the radial space required only marginally as compared with a normal differential controlled by a viscous shear coupling. Since, in any event, the viscous coupling is normally included within an outer housing it is possible to introduce the deformable sleeve in practice usually without increasing the space required.

It is also possible to make the chamber of very small dimensions so that only a very small amount of fluid is required to deform the sleeve. By using a fluid which has a low coefficient of thermal expansion, and also by virtue of the small amount of fluid required, one can avoid undesired deformation of the sleeve due to temperature rises which normally take place in a viscous shear coupling when it operates.

In one arrangement the chamber may be connected to a piston and cylinder arrangement which may be used to pressurize the chamber. The cylinder may have its longitudinal axis coincident with the common axis of the assembly.

The assembly may include a second hub in the housing member and rotatable relative thereto about said common axis, the second hub carrying a third set of annular elements which are rotationally fast therewith and are interleaved with the elements of the first set. In other words the viscous coupling can be of the general type described in European PS-No. 0068309 referred to above.

The channel which forms the chamber may be formed either in one of the members and/or in the sleeve itself.

Preferably the housing member is supported in bearings in the coupling member so that when the chamber is unpressurised the housing member may rotate in the coupling member with substantially no friction. It is advantageous if the bearings are arranged at or adjacent to the ends of the deformable sleeve. Preferably when the chamber is de-pressurized there is a running clearance between the sleeve and said other member of the order of 0.01 mm to 0.05 mm, preferably between 0.01 mm and 0.02 mm.

It is preferred to use, as the fluid medium for deforming the sleeve, a liquid consisting entirely or mainly of glycerine. This is because glycerine has a low coefficient of thermal expansion and this helps to avoid unintended deformation of the sleeve due to temperature rises.

The transmission assembly may include a differential gear, the coupling member being connected, or adapted for connection, to one member of the differential gear and the hub being connected, or adapted for connection, to another member of the differential gear. In this way the differential gear can be controlled or not at will by the viscous coupling by connecting or disconnecting the coupling member and the housing member.

The differential gear may be a bevel gear differential gear comprising a carrier, planet gears rotatable with the carrier and sun gears meshing with the planet gears, the coupling member being connected or integral with the carrier and the hub being connected to one of the sun gears either directly or via a drive shaft engaging both the hub and the sun gear.

In another arrangement the coupling member is connected to one of the sun gears either directly or via the drive shaft which engages the one sun gear and the hub is connected to the other of the sun gears either directly or via the drive shaft which engages the other sun gear.

The invention also includes a motor vehicle including a prime mover, road wheels, brakes for the road wheels, a drive transmission between the prime mover and the road wheels and including a disconnectable transmission assembly embodying the invention, there being means for applying said predetermined fluid pressure to the chamber when the prime mover is operating and the brakes are not applied.

Thus on braking, the chamber will be depressurised and the differential will not be controlled by the viscous coupling.

In another method of operation, there may be means to sense slip between road wheels of the vehicle and control means for applying said predetermined fluid pressure to the chamber only when the slip is sensed and the brakes are not applied.

This latter method of operation is advantageous in a front wheel drive vehicle if the vehicle has to be towed with the front axle lifted.

BRIEF DESCRIPTION OF DRAWINGS

The invention will now be described in detail by way of example with reference to the accompanying diagrammatic drawings in which.

DESCRIPTION OF PREFERRED EMBODIMENTS

Figure 1:
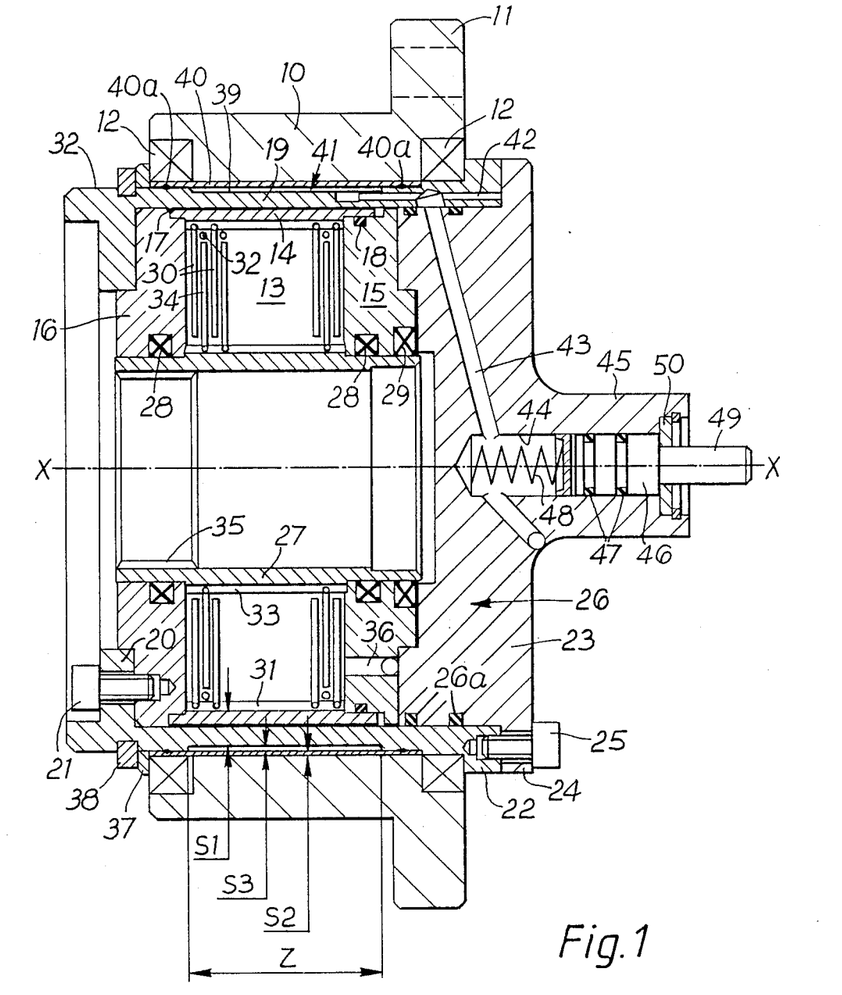
FIG. 1 is a longitudinal section through a disconnectable transmission assembly constituting a first embodiment of the invention.

Referring now to FIG. 1, the assembly there shown comprises a rigid coupling member 10 in the form of a cylinder having a coupling flange 11 at one end thereof. Rotatably mounted in the bore of the coupling member in bearings 12 carried by the coupling member is a viscous shear coupling indicated generally at 13. The viscous coupling has a multi-part housing member which comprises an internally splined cylinder 14 into the ends of which are inserted end members 15 and 16. The end member 16 is welded to the sleeve 14 at 17 and the end member 15 is sealed to the sleeve 14 at 18. Surrounding the cylinder 14 is a further cylinder 19. At its left-hand-end in FIG. 1 the cylinder 19 has an internal flange 20 which fits into a recess in the end member 16 and is bolted thereto by bolts 21. At its right-hand end the sleeve 19 has an external flange 22 and within that end there is received an end plate 23 having a peripheral flange 24 which is bolted to the flange 22 by bolts 25. The end plate is relatively thick and is sealed within the cylinder 19 by seals 26a. The cylinders 14 and 19, the end members 15 and 16 and the end plate 23 together form a housing member indicated generally at 26.

Rotatable within the end plates 15 and 16 is a hub 27 which is sealed to the end plates by running seals 28. If desired bearings may be interposed between the end plates 15 and 16 and the hub. A further seal 29 is arranged at the right-hand end of the hub between the end member 15 and the end plate 23. Each of the coupling member 10, the housing member 26 and the hub 27 are relatively rotatable about a common axis X—X.

A first set of annular plates 30 is engaged with the internal splines 31 in the cylinder 14. These plates may be spaced apart by spacer rings one of which is shown at 32. The exterior of the hub 27 is splined at 33 and carries a second set of plates 34 which engage the splines 33. All the plates are annular and the plates of the first set are interleaved with the plates of the second set as is clear from the drawings. The plates 34 are movable axially on the splines 33. The internal bore of the hub 27 is provided with splines 35 to receive a drive shaft, not shown.

The interior of the cylinder 14 contains a viscous liquid, e.g. silicone oil. The oil does not completely fill the cylinder which contains a volume of gas, e.g. air. The cylinder can be filled through a filling opening 36.

The coupling member 10 is located axially relative to the housing member 26 between the flange 22 on the cylinder 19 and a back-up ring 37 and a circlip 38 received in a groove in the outer surface of the cylinder 19. Thus the housing member can rotate relative to the coupling member in the bearings 12 but is prevented from axial movement as described.

Over a length Z as shown in FIG. 1 the external surface of the cylinder 19 is provided with an annular channel 39 of small dimension. The channel is closed to form a chamber by a deformable metal sleeve 40. The metal sleeve overlaps the ends of the channel 39 and is welded to the outer surface of the cylinder 19 at each end at 40a. The sleeve extends within the left-hand bearing 12 but terminates adjacent to the right-hand bearing 12. The channel 39 and the sleeve 40 together form a chamber 41 which is connected by a longitudinal bore 42 in the cylinder 19 and a passage 43 in the end plate 23 with a cylinder 44 formed in a projection 45 of the end plate. Reciprocable in the cylinder 44 is a piston 46 carrying sealing rings 47 and urged to the right in FIG. 1 by a spring 48. The piston has a rod 49 which extends out through a sealing washer 50 for external operation of the piston. The space consisting of the chamber 41, the bore 42, the passage 43 and the cylinder 44 is filled with glycerine or a liquid which consists mainly of glycerine. Glycerine is used because it has a very low coefficient of thermal expansion.

It will be clear that the sleeve 40 is arranged between opposed parts of the coupling member 10 and the housing member 26 and as will now be described the application of pressure to the chamber 41 deforms the sleeve into friction locking engagement with the bore of the coupling member 10 thus coupling the housing member 26 and the coupling 10 for rotation. When pressure is released in the chamber 41 there is a running clearance between the outer surface of the sleeve 40 and the bore of the coupling member 10 thus allowing relative rotation to take place between the housing member and the coupling member 10 via the bearings 12.

The radial wall thickness of the housing member 26 which is the combined thickness of the cylinders 14 and 19 less the depth of the channel 39 over the length Z is such as to provide a rigid wall to the chamber 41 is indicated at S1. The depth of the chamber is indicated at S3 in FIG. 1 and the thickness of the sleeve 40 at S2. The thickness S2 must be very much smaller than the thickness S1 so as to ensure that when pressure is applied to the chamber 41 the sleeve 40 deforms into engagement with the surface of the bore in the coupling member 10 without any distortion of the housing member 26.

In summary, thus far, the transmission assembly may be used to transmit torque between a member connected to the coupling flange 11 of the coupling member 10 and a shaft engaged in the splines 35 of the hub 27. When the chamber 41 is de-pressurised, i.e. the piston is in the position shown in FIG. 1, there is a running clearance between the outer surface of the sleeve 40 and the bore in the coupling member 10 which is of the order of between 0.01 mm and 0.05 mm, preferably between 0.01 mm and 0.02 mm. When the piston 46 is moved to the left against the action of the spring 48, the glycerine in the system as described above is pressurised and upon the attainment of a predetermined pressure in the chamber 41 the sleeve 40 is deformed into friction locking engagement with the coupling member 10 thus locking the coupling member and the housing member together. Torque may then be transmitted to the hub 27 due to shearing of the viscous fluid in the coupling 13 between the plates 30 and 34.

Figure 2:
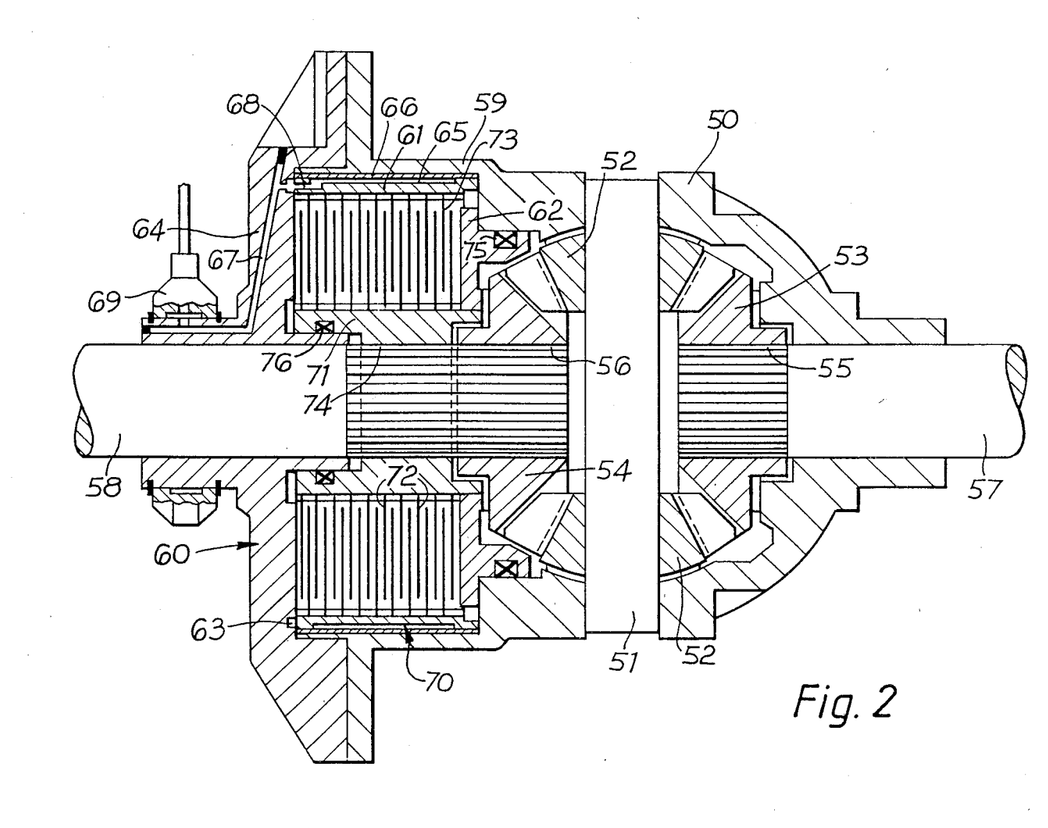
FIG. 2 is a longitudinal section showing the combination of an assembly similar to that shown in FIG. 1 with a bevel gear differential.

A transmission assembly as described above has particular application to the control of a differential gear and its application to a bevel type differential gear is shown diagrammatically in FIG. 2.

Referring to this Figure, the carrier of the differential gear is indicated at 50 and carries a planet pin 51 on which planet gears 52 are rotatably mounted. The planet gears mesh with sun gears 53 and 54. The sun gears are internally splined at 55 and 56 respectively to receive the splined ends of drive shafts 57 and 58 respectively.

The carrier 50 is extended to the left in FIG. 2 to provide a coupling member 59. An end member 64 is fixed to the coupling member 59. Within the coupling member there is a viscous coupling indicated generally at 60 with a housing member comprising a cylinder 61 which is a close fit between axially facing radially extending surfaces of the carrier 50 and n member 64, so as to be rotatable relative to these two components whilst having sealing engagement therewith. A further end member 62 is provided within the carrier 50. The external surface of the cylinder 61 is provided with a recess 65 which is closed by a deformable sleeve 66 to provide a chamber 70. The chamber 70 is provided with pressure fluid through a passage 67 in the end member 64 leading into an annular groove 63 in the radially extending surface of end member 64, facing the cylinder 61 to communicate with a bore 68 therein and thence the recess 65. The passage 67 communicates with a slip ring 69 through which pressure fluid can be delivered to the passage and thereby to the chamber 70.

A hub 71 is provided within the housing member and is externally splined to receive annular plates 72 which are interleaved with annular plates 73 carried on splines in the bore of the cylinder 61. The hub 71 is internally splined at 74 and is engaged by the splined end of the drive shaft 58, the latter thus engages the splines in the hub 71 as well as the splines in the sun gear 54 and thus connects the hub 71 and the sun gear 54 together.

The end member 62 is welded to the hub 71 and is sealed to the carrier 50 at 75. The hub 71 is sealed to the end member 64 at 76.

It will be seen that the viscous coupling consisting of the housing member 60, the hub 71 and the plates 72 and 73 is connected to the sun gear 54 and is connectable to the carrier 50 by deformation of the sleeve 66 by applying pressure to the chamber 70 via the slip ring 69. The operation is as described in relation to FIG. 1. Thus when the chamber 70 is not pressurised there is no restriction on the differential action because there is no connection between the carrier 50 and the sun gear 54. When the chamber 70 is pressurised, however, the viscous coupling acts across the differential gear and thus restricts the differential action upon relative rotation between the carrier 50 and the sun gear 54.

In a modification, not illustrated, the housing member 50 could be connected to the other sun gear 53 instead of to the carrier 50 and could be connected directly to the sun gear or via the drive shaft 57. Similarly, the hub 71 could be connected directly to the sun gear 54 instead of being connected thereto via the drive shaft 58.

Figure 3:
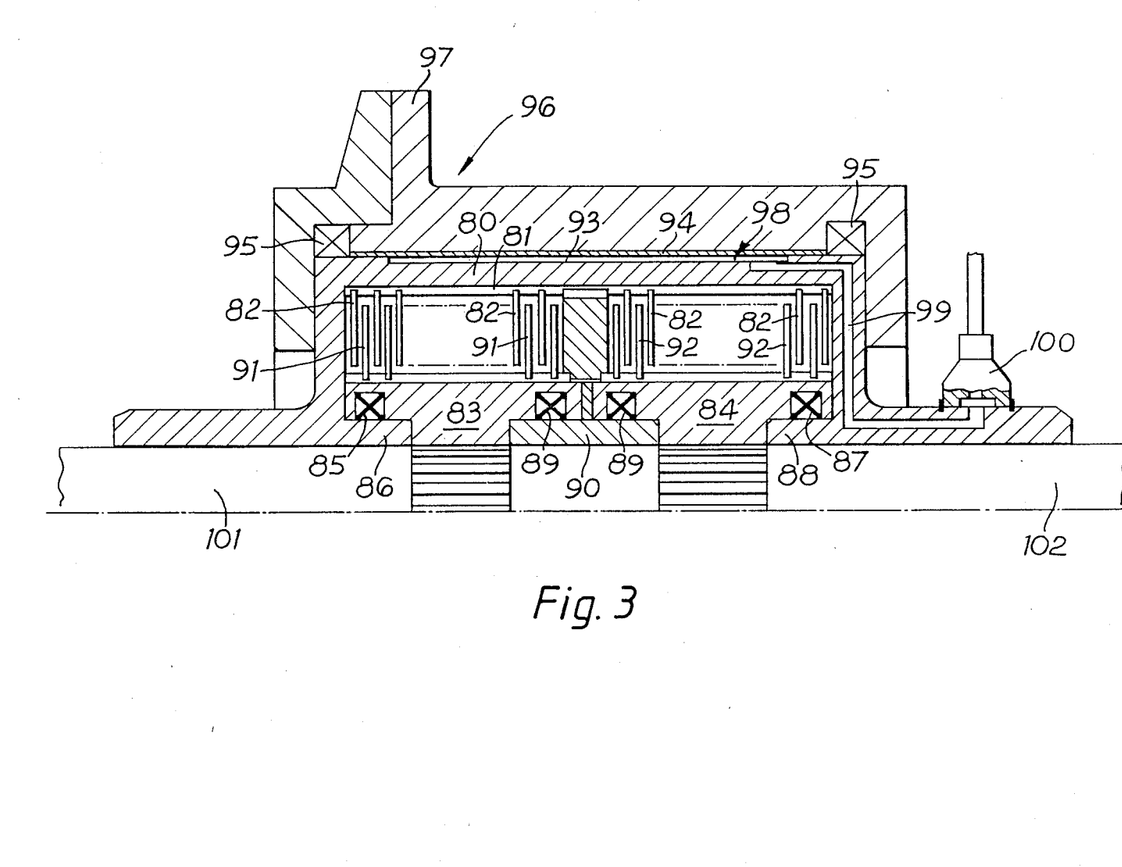
FIG. 3 is a longitudinal section of a second embodiment of a disconnectable transmission assembly embodying the invention.

Referring now to FIG. 3, this shows diagrammatically another embodiment of the invention. The arrangement consists of a housing member 80 which is internally splined at 81 and carries a first set of plates some of which are indicated at 82.

Rotatably mounted within the housing member 80 are first and second hubs 83 and 84. The hub 83 is sealed at 85 to an internally projecting flange 86 of the housing member and the hub 84 is sealed at 87 to a similar internally projecting flange 88. The inner ends of the hubs are sealed at 89 to the sleeve 90. The first hub 83 carries a second set of plates, some of which are indicated at 91 which are interleaved with the plates 82 and the hub 84 carries a third set of plates 92 which are interleaved with the first set of plates 82. The hubs are externally splined to carry the plates which may be axially movable on the hubs.

The housing member is provided in its outer surface with a recess 93 which is closed by a deformable sleeve 94 welded at its ends to the housing member. The housing member is supported in bearings 95 in a coupling member indicated generally at 96. The coupling member is in two parts and has a coupling flange 97.

A chamber 98 is provided between the recess 93 and the deformable sleeve 94 and this may be provided with pressure fluid by means of a passage 99 which can be supplied with pressure fluid via a slip coupling 100.

Drive shafts 101 and 102 engage the splined inner bores of the hubs 83 and 84 respectively.

The operation is substantially similar to that of the transmission assembly described in relation to FIG. 1 in that when the chamber 98 is pressurised by fluid pressure supplied through the slip coupling 100, the deformable sleeve 94 is deformed into engagement with the inner periphery of the coupling member 96 thus connecting the coupling member and housing member for rotation. Torque may then be transmitted from the coupling flange 97 by viscous shear between the plates 82 on the one hand and 91 and 92 on the other to the hub members 83 and 84 and thus to the drive shafts 101 and 102.

When the chamber 98 is de-pressurised then there is a running clearance of the magnitude described above between the outer surface of the deformable sleeve 94 and the bore of the coupling member 96. The general construction of a viscous coupling of the type shown in FIG. 3 is to be found in, for example, European PS-No. 0068309 (and the corresponding U.S. Pat. No. 4,721,010 issued Jan. 26th, 1988) to which reference should be made.

Figure 4:
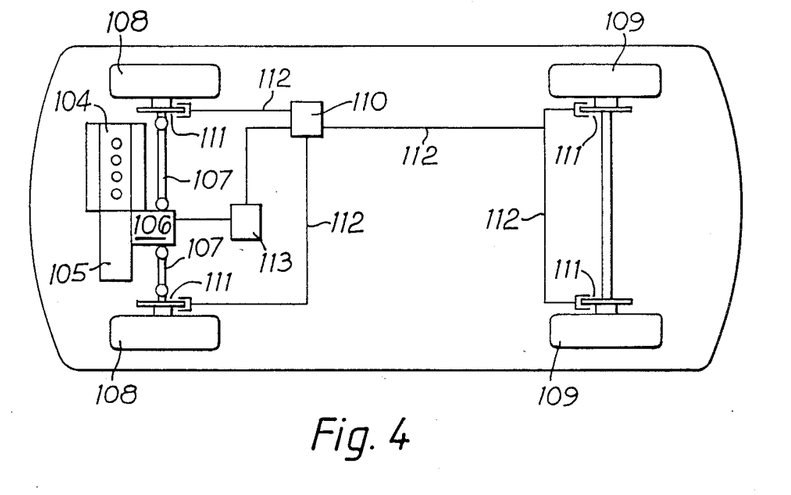
FIGS. 4 and 5 are diagrams illustrating the application of the disconnectable transmission assembly of the invention to a motor vehicle.

Turning now to FIG. 4, this shows the application of the transmission assembly embodying the invention to a two-wheel drive vehicle. The vehicle comprises a prime mover 104 which drives through a gear box 105 a front axle differential assembly 106. The differential assembly may conveniently be of the form shown in FIG. 2. The drive shafts from the differential assembly are indicated at 107 and drive front road wheels 108. The rear road wheels 109 are not driven.

The wheels are provided with a braking system comprising a control 110 and individual brakes 111 at the wheels, the brakes being connected to the control system by lines 112. A control system 113 for the differential assembly 106 is also connected to the control means 110 as well as to the differential assembly.

In one method of operation, the control means 113 is arranged so that the chamber 41 in the arrangement of FIG. 1 is pressurised when the engine 104 is operated. Thus normally the differential assembly 106 will operate as a differential whose differential action is controlled by the viscous coupling. However, if the brakes are applied then the control means 110 sends a signal to the control means 113 which vents the chamber 41 thus freeing the differential.

Thus normally, the transmission assembly 106 will act as a limited slip differential for the front wheels so that if one wheel slips torque will be transmitted to the other wheel through the viscous coupling. If, however, braking takes place then this torque transmission will cease to take place because during braking this could have a adverse affect on the steering performance.

If the vehicle is fitted with an anti-lock braking system then in another method of operation the control means 113 would only pressurise the chamber to control the differential action of the differential when there was slip between the wheels 108. However such pressurisation would not be applied when the brakes were applied. The slip would be sensed by the sensing means used for the anti-lock braking system.

Figure 5:
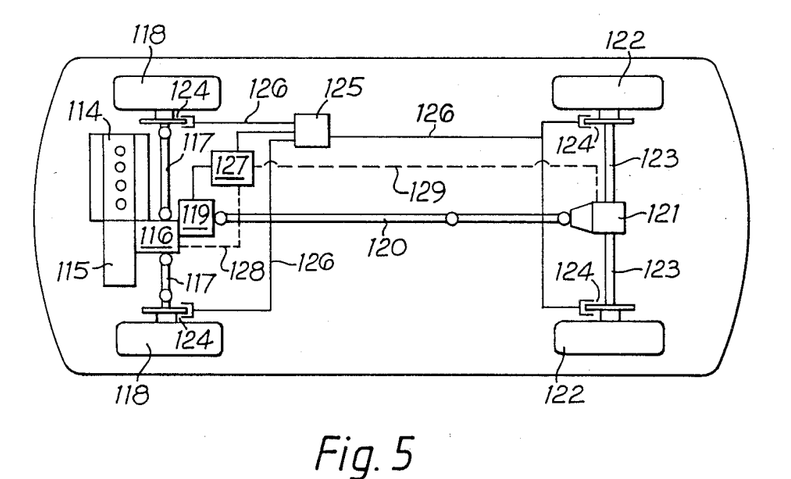

Referring now to FIG. 5, this illustrates a four-wheel drive vehicle in which there is a prime mover 114 for driving a gear box 115 which drives a front axle differential gear 116 which, through drive shafts 117, drives the front road wheels 118. Also driven from the gear box 116 is a disconnectable transmission assembly embodying the invention indicated at 119 and this drives a propeller shaft 120 which in turn drives a rear axle differential 121. The rear axle differential drives road wheels 122 via drive shafts 123.

Each of the road wheels is provided with a brake 124 which is connected to brake control means 125 by lines 126. Control means 127 is provided for the coupling 119 and is connected both to the control means 125 and to the coupling.

In operation, the front road wheels 118 are continuously driven via the front differential 116. If desired this front differential may itself be of limited slip differential of the type shown in FIG. 2 and in such case this will also be connected to the control means 127 by a line 128.

The rear axle will be driven through the transmission assembly 119 the coupling member of which will be connected to the gear box 115 and the hub to the propeller shaft. The propeller shaft will drive the rear differential 121 which in turn will drive the rear wheels. The rear differential 121 may be a normal differential or may be a differential of the type described in FIG. 2 in which case it also will be connected to the control means 127 by a line 129.

Normally, as was stated above, the vehicle would be driven solely by the front road wheels 118. Should, however, the front road wheels slip then there will be relative rotation between the housing member and the hub in the transmission assembly 119. If the chamber is pressurised in the assembly and the deformable sleeve engages the coupling member then drive will be transmitted to the propeller shaft 120 and will drive the rear wheels 122.

One method of operation is to have the transmission assembly engaged, i.e. the coupling member and the housing member rotatably connected, whenever the engine 114 is running so that normally drive will take place to the rear wheels when the front wheels slip, or one of the front wheels slips. However the arrangement is such that if the brake is applied then a signal is taken from the brake control means 125 to the transmission assembly control means 127 which will de-pressurise the chamber and thus disconnect drive to the rear axle.

There are two reasons for this. The first is that if the front wheels are braked hard and lock and the rear wheels tend to rotate then the torque will build up across the viscous coupling in the drive unit 119 which will tend to lock the rear wheels which will make the vehicle unstable.

Secondly, if an anti-lock braking system is provided, the connection between the front and rear wheels via the assembly 119 will disturb the operation of the anti-lock braking system.

In another mode of operation, the viscous coupling is only connected across the differential in the assembly 119 if there is slip between the road wheels of the vehicle i.e. between one or both of the front wheels and the rear wheels. The slip can be sensed by the sensors used in an anti-lock braking system when this is fitted to the vehicle.

If the front and/or rear axle differentials 116 and 121 are of the type shown in FIG. 2 then these are also controlled by the control means 127 to release the viscous control of the differential when the brakes were applied.

In a further embodiment, the rear axle differential 121 may be replaced by a transmission assembly according to FIG. 3 and in this case the propeller shaft 120 will be driven directly from the gear box with the assembly 119 omitted. In this arrangement, assuming that the brakes are not applied, then there will only be drive to the rear wheels 122 when there is relative rotation between the housing member and the hub of the assembly as shown in FIG. 3. Assuming that the chamber 98 is pressurised when the engine is running then this will give four-wheel drive when the front wheels slip relative to the rear wheels. However when the brakes are applied the pressure in the chamber 98 would be vented so that there will be no drive to the rear wheels and therefore no possibility of rear wheel lock.

As before, the pressurisation of the chamber 98 may be continuous while the engine is running, except when the brakes are applied, or the chamber may only be pressurised when there is slip between one or both of the front wheels and the rear wheels and in such case the slip can be detected by the means used in the anti-lock braking system if fitted.

Preferably, the fluid used to pressurise the chamber in each of the embodiments is glycerine or a liquid which consists mainly of glycerine. The reason for this is that the viscous couplings get hot during operation and glycerine has a low coefficient of thermal expansion as described above and thus unwanted deformation of the deformable sleeve in any of the embodiments will not be obtained merely due to a rise in pressure in the chamber due to a rise in temperature.

It will be seen that the invention provides a disconnectable transmission assembly which is very compact and has a particular application in the construction of vehicles.

We claim:

1. A disconnectable transmission assembly comprising a rigid coupling member having a cylindrical bore; a viscous shear coupling mounted within the bore, the coupling comprising a rigid housing member rotatably mounted in the coupling member, and a hub within the housing member, each of the coupling member, the housing member and the hub being rotatable relative to each other about a common axis, first and second sets of annular elements in the housing, the elements of the first set being rotationally fast with the housing part and being interleaved with the elements of the second set which are rotationally fast with the hub; and a deformable sleeve interposed between opposed parts of the housing member and the coupling member, the sleeve being secured to one of said members and closing a chamber formed between the sleeve and said part of said one member; the arrangement being such that when the chamber is unpressurised said members are relatively rotatable but that the application of a predetermined fluid pressure to the chamber causes the sleeve to deform and engage said part of the other member frictionally to lock the members to rotate together.

2. An assembly according to claim 1 including a cylinder, a piston movable in the cylinder and a connection between the cylinder and the chamber whereby movement of the piston can apply pressure to the chamber.

3. An assembly according to claim 2 wherein the cylinder is arranged with its longitudinal axis coincident with the common axis.

4. An assembly according to claim 1 including a second hub in the housing member and rotatable relative thereto about said common axis, the second hub carrying a third set of annular elements which are rotationally fast therewith and being interleaved with elements of the first set.

5. An assembly according to claim 1 wherein the chamber is partly formed by a recess in one of the members or in the sleeve.

6. An assembly according to claim 1 wherein the housing member is rotatably supported by bearings in the coupling member.

7. An assembly according to claim 6 wherein the bearings are arranged at or adjacent to the ends of the sleeve.

8. An assembly according to claim 1 wherein when the chamber is unpressurised there is a running clearance between the sleeve and said part of the other member.

9. An assembly according to claim 1 wherein the chamber is filled with a pressure fluid consisting essentially of glycerine.

10. A disconnectable transmission assembly comprising a differential gear, a rigid coupling member having a cylindrical bore and connected, or adapted for connection, to one member of the differential gear; a viscous shear coupling mounted within the bore, the coupling comprising a rigid housing member rotatably mounted in the coupling member, and a hub within the housing member and connected, or adapted for connection, to another member of the differential gear, each of the coupling member, the housing member and the hub being rotatable relative to each other about a common axis, first and second sets of annular elements in the housing, the elements of the first set being rotationally fast with the housing part and being interleaved with the elements of the second set which are rotationally fast with the hub; and a deformable sleeve interposed between opposed parts of the housing member and the coupling member, the sleeve being secured to one of said members and closing a chamber formed between the sleeve and said part of said one member; the arrangement being such that when the chamber is unpressurised said members are relatively rotatable and there is no restriction in the differential action of the differential gear but that the application of a predetermined fluid pressure to the chamber causes the sleeve to deform and engage said part of the other member frictionally to lock the members to rotate together so that the viscous coupling acts between said members of the differential gear.

11. A transmission assembly according to claim 10 wherein the differential gear is a bevel gear differential gear comprising a carrier, planet gears rotatable with the carrier and sun gears meshing with the planet gears and wherein the coupling member is connected to or integral with the carrier and the hub is connected to one of the sun gears either directly or via a drive shaft engaging both the hub and said one sun gear.

12. A transmission assembly according to claim 10 wherein the differential gear is a bevel gear differential gear comprising a carrier, planet gears rotatable with the carrier and sun gears meshing with the planet gears and receiving respective drive shafts and wherein the coupling member is connected to one of the sun gears either directly or via the drive shaft engaging said one sun gear and the hub is connected to the other of the sun gears either directly or via the drive shaft engaging said other sun gear.

13. In a motor vehicle including a prime mover; road wheels and brakes for the road wheels; a drive transmission between the prime mover and the road wheels and including a disconnectable transmission assembly comprising a rigid coupling member having a cylindrical bore; a viscous shear coupling mounted within the bore, the coupling comprising a rigid housing member rotatably mounted in the coupling member, and a hub within the housing member, each of the coupling member, the housing member and the hub being rotatable relative to each other about a common axis, first and second sets of annular elements in the housing, the elements of the first set being rotationally fast with the housing part and being interleaved with the elements of the second set which are rotationally fast with the hub; and a deformable sleeve interposed between opposed parts of the housing member and the coupling member, the sleeve being secured to one of said members and closing a chamber formed between the sleeve and said part of said one member; the arrangement being such that when the chamber is unpressurised said members are relatively rotatable but that the application of a predetermined fluid pressure to the chamber causes the sleeve to deform and engage said part of the other member frictionally to lock the members to rotate together; and means for applying said predetermined fluid pressure to the chamber when the prime mover is operating and the brakes are not applied.

14. A drive transmission according to claim 13 including means to sense slip between road wheels of the vehicle and control means for applying said predetermined fluid pressure to the chamber only when said slip is sensed and the brakes are not applied.

15. In a motor vehicle including a prime mover, a drive transmission having first and second pairs of drivable wheels wherein, when the vehicle is being driven, the wheels of one of said pairs are driven directly and permanently from the prime mover via an interwheel differential gear and the wheels of the other pair are connected to the prime mover via a disconnectable transmission assembly comprising a rigid coupling member having a cylindrical bore; a viscous shear coupling mounted within the bore, the coupling comprising a rigid housing member rotatably mounted in the coupling member, and a hub within the housing member, each of the coupling member, the housing member and the hub being rotatable relative to each other about a common axis, first and second sets of annular elements in the housing, the elements of the first set being rotationally fast with the housing part and being interleaved with the elements of the second set which are rotationally fast with the hub; and a deformable sleeve interposed between opposed parts of the housing member and the coupling member, the sleeve being secured to one of said members and closing a chamber formed between the sleeve and said part of said one member; the arrangement being such that when the chamber is unpressurised said members are relatively rotatable but that the application of a predetermined fluid pressure to the chamber causes the sleeve to deform and engage said part of the other member frictionally to lock the members to rotate together.

* * * * *